US012634563B2

(12) United States Patent
Bambha et al.

(10) Patent No.: US 12,634,563 B2
(45) Date of Patent: *May 19, 2026

(54) AUTOMATED TRAILER GENERATION

(71) Applicant: ROKU, INC., San Jose, CA (US)

(72) Inventors: Abhishek Bambha, Burlingame, CA (US); Ronica Jethwa, Mountain View, CA (US); Rohit Mahto, San Jose, CA (US); Nam Vo, San Jose, CA (US); Fei Xiao, San Jose, CA (US); Lian Liu, Rancho Palos Verdes, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,850

(22) Filed: Sep. 25, 2024

(65) Prior Publication Data

US 2025/0024123 A1 Jan. 16, 2025

Related U.S. Application Data

(63) Continuation of application No. 18/484,041, filed on Oct. 10, 2023, now Pat. No. 12,132,976, which is a continuation of application No. 18/076,476, filed on Dec. 7, 2022, now Pat. No. 11,838,605.

(51) Int. Cl.
*H04N 21/8549* (2011.01)
*G06F 16/783* (2019.01)

(52) U.S. Cl.
CPC ....... *H04N 21/8549* (2013.01); *G06F 16/783* (2019.01)

(58) Field of Classification Search
CPC .......................... H04N 21/8549; G06F 16/783
USPC ......................................................... 386/278
See application file for complete search history.

(56) References Cited

U.S. PATENT DOCUMENTS

| | | | |
|---|---|---|---|
| 9,378,209 B2 * | 6/2016 | Chowdhury | G06F 16/739 |
| 10,394,887 B2 * | 8/2019 | Chowdhury | H04N 21/23418 |
| 10,545,720 B2 * | 1/2020 | Bittner | G11B 27/031 |
| 10,560,657 B2 * | 2/2020 | Noel | G11B 27/031 |
| 10,917,684 B2 * | 2/2021 | Greene | H04N 21/4147 |
| 11,284,171 B1 | 3/2022 | Nair et al. | |
| 11,321,946 B2 * | 5/2022 | Grady | G06V 20/48 |
| 11,336,972 B1 | 5/2022 | Hamid et al. | |
| 11,356,750 B2 | 6/2022 | Tegethoff et al. | |
| 11,399,214 B1 | 7/2022 | Phillips et al. | |
| 11,551,256 B2 * | 1/2023 | Kveton | G06Q 30/0242 |

(Continued)

*Primary Examiner* — Helen Shibru
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product aspects, and/or combinations and sub-combinations thereof, for generating trailers (previews) for multimedia content. An example aspect operates by generating an initial set of candidate points to generate a trailer for a media content; determining conversion data for each of the initial set of candidate points; determining an updated set of candidate points based on the conversion data; determining an estimated mean and upper bound for each of the updated set of candidate points; computing a value for each of the updated set of candidate points; generating a ranked list based on the value computed for each of the updated set of candidate points; and repeating the process until an optimal candidate point is converged upon.

20 Claims, 4 Drawing Sheets

(56) References Cited

U.S. PATENT DOCUMENTS

| | | | |
|---|---|---|---|
| 11,605,117 B1 | 3/2023 | Zavaleta et al. | |
| 11,646,007 B1 | 5/2023 | Lyske | |
| 11,729,478 B2 * | 8/2023 | Hitching | H04N 21/2668 |
| | | | 725/41 |
| 11,838,605 B1 | 12/2023 | Bambha et al. | |
| 11,853,344 B2 * | 12/2023 | Mehrotra | H04N 21/6582 |
| 12,020,279 B2 | 6/2024 | D'Auria | |
| 2021/0049627 A1 | 2/2021 | Romagnolo et al. | |
| 2021/0319470 A1 | 10/2021 | Kveton et al. | |
| 2022/0366692 A1 | 11/2022 | Weerasinghe et al. | |
| 2022/0414149 A1 | 12/2022 | Jindal et al. | |
| 2024/0129565 A1 * | 4/2024 | Ravuru | G06F 16/735 |
| 2024/0196070 A1 | 6/2024 | Bambha et al. | |
| 2024/0323486 A1 * | 9/2024 | Pau | H04N 21/466 |
| 2024/0412271 A1 * | 12/2024 | Xiao | G06Q 30/0631 |

* cited by examiner

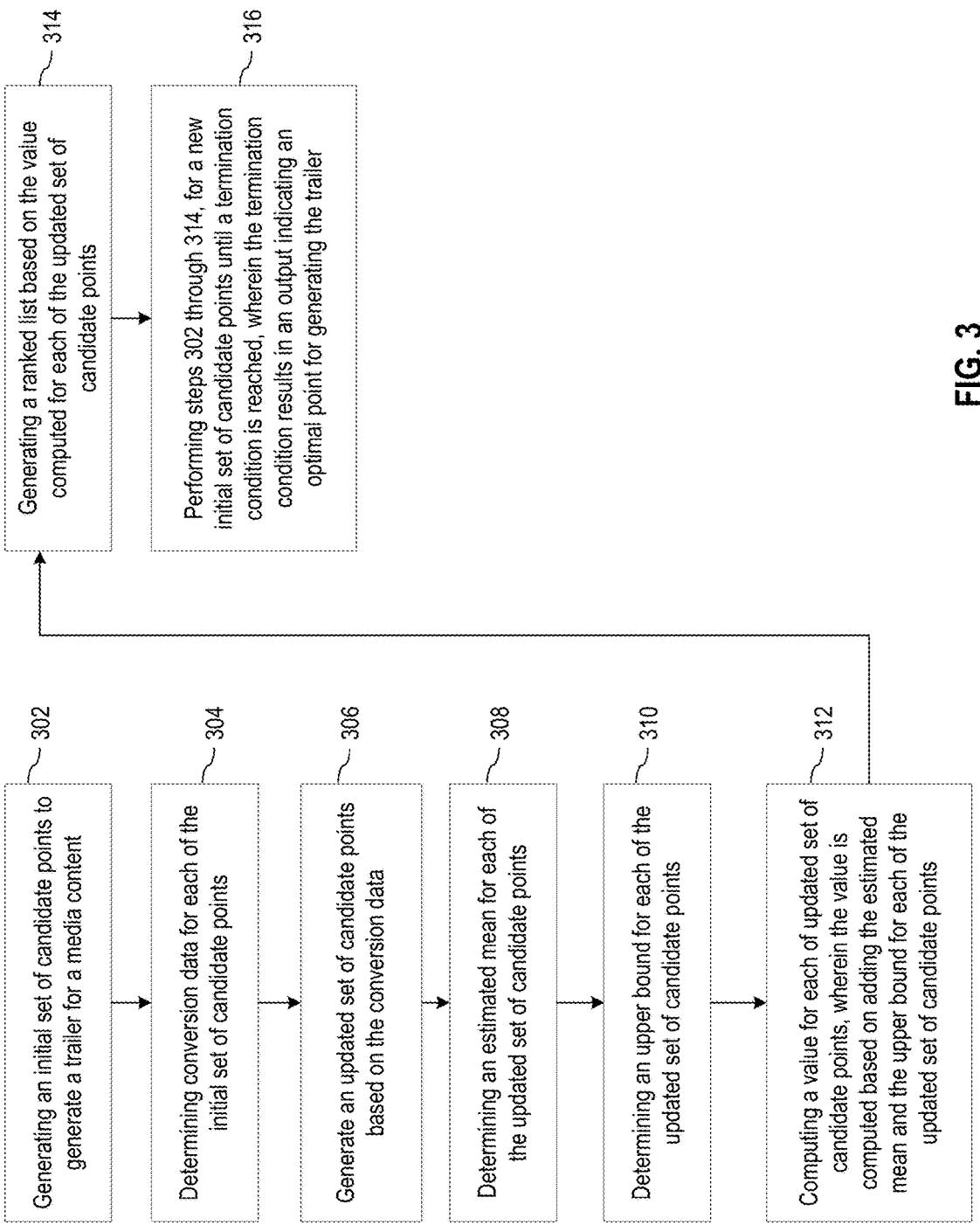

300

302 Generating an initial set of candidate points to generate a trailer for a media content 304 Determining conversion data for each of the initial set of candidate points 306 Generate an updated set of candidate points based on the conversion data 308 Determining an estimated mean for each of the updated set of candidate points 310 Determining an upper bound for each of the updated set of candidate points 312 Computing a value for each of updated set of candidate points, wherein the value is computed based on adding the estimated mean and the upper bound for each of the updated set of candidate points 314 Generating a ranked list based on the value computed for each of the updated set of candidate points 316 Performing steps 302 through 314, for a new initial set of candidate points until a termination condition is reached, wherein the termination condition results in an output indicating an optimal point for generating the trailer

FIG. 3

AUTOMATED TRAILER GENERATION

CROSS-REFERENCE TO RELATED APPLICATIONS

This application is a continuation of U.S. application Ser. No. 18/484,041, filed on Oct. 10, 2023, which is a continuation of U.S. application Ser. No. 18/076,476, filed on Dec. 7, 2022. The contents of both are incorporated by reference herein in their entireties.

BACKGROUND

Field

This disclosure is generally directed to multimedia systems, and more particularly to generating previews (e.g., trailers) for multimedia content.

Background

Streaming services for multimedia content (e.g., movies, television series, etc.) typically offer users previews of the multimedia content. These previews are often in the form of trailers. The purpose of these trailers is to boost user engagement with the multimedia content so that the user will consume the content (e.g., play, stream, download, etc., the movies and shows).

Conventionally, previews (or trailers) are generated manually. For example, one or more clips from the multimedia content are manually chosen, and those clips are manually edited to form a 30 second trailer. Often these clips are chosen at random to fit the genre of the movie and guesses/assumptions are made as to what clips will best engage users.

This conventional trailer generation approach is deficient for at least two reasons. First, it does not scale properly. When there is a lot of multimedia content to make trailers for (e.g., hundreds or thousands of movie and/or show titles), manually generating trailers is both costly and time consuming. Second, determining what clips will make for the best trailers (e.g., for user engagement) is an inexact science (e.g., the process is often subjective). Often guesses are made as to what clips will make for the best trailers. These guesses may or may not lead to high user engagement. Thus, such approaches are not optimized to generate the best trailers and/or for user engagement. Moreover, such approaches are only capable of being produced by human operators.

SUMMARY

Provided herein are system, apparatus, article of manufacture, method, and/or computer program product aspects, and/or combinations and sub-combinations thereof, for automated preview (e.g., trailer) generation for multimedia content. The multimedia content refers to shows, movies, series, documentaries, etc. of a multimedia service. The system, apparatus, article of manufacture, method, and/or computer program product aspects is designed to solve the technological problems outlined in the Background section. Namely, (1) scaling trailer generation, (2) optimizing for the best clips to use as trailers to better engage users, and (3) allowing computers to produce relevant and user engaging trailers that previously could only be produced by human operators.

Aspects operate by first generating an initial set of candidate points. The initial set of candidate points refer to instances of a multimedia content that can be used as starting points to generate a trailer. The initial set of candidate points can be sampled from any point of the multimedia content. In aspects, a predetermined number of initial set of candidate points can be chosen. For example, in aspects, this can be fifty points. A variety of methods can be used to generate the initial set of candidate points. For example, the initial set of candidate points can be chosen at random. In other aspects, computer implemented models can be used to generate the initial set of candidate points. For example, content based models (such as deep video understanding models), interaction based models (such as those using clip interaction data), or commercially available artificial intelligence (AI) based models such as those provided by Vionlabs AB of Stockholm, Sweden can be used. These models seek to obtain mood, interaction, and/or features of scenes for the multimedia content, so that candidate points are chosen to best represent the multimedia content.

In aspects, once the initial set of candidate points are generated, conversion data for each of the initial set of candidate points can be determined. Conversion data refers to how often users engage/consume the multimedia content when each of the initial set of candidate points is set as the beginning of a trailer. Thus, in aspects, for each of the initial set of candidate points, a 30 second clip can be generated as a trailer with that initial candidate point being the start of the 30 second clip. That clip can be shown to users of the multimedia system, and engagement statistics determined. In aspects, the initial set of candidate points can be input into a computer implemented model to obtain the conversion data. In aspects, the model can be a Multi-Armed Bandit (MAB) model. MAB models are known to persons of skill in the art and will not be discussed in detail. For the purposes of discussion with respect to this disclosure, it is assumed that the MAB model outputs the conversion data.

In aspects, once the conversion data is obtained, an updated set of candidate points can be sampled based on which of the initial set of candidate points is determined by the MAB model to have the highest conversion data. For example, the sampling can include choosing the updated set of candidate points close to the initial set of candidate points with the highest rates of conversion. Alternatively, in another aspect, the update set of candidate points can be sampled randomly without considering the conversion data.

In aspects, once the updated set of candidate points are obtained, an estimated mean and an upper bound for each of the updated set of candidate points can be determined. The purpose of determining the estimated mean and the upper bound for each of the updated set of candidate points is two fold. First, the purpose is to exploit knowledge of what updated set of candidate points best engage the users, and second is to use this knowledge to explore further candidate points around each of the updated set of candidate points that might better engage the users. Thus, the purpose of performing these computations is to optimize for the best point to use as the starting point of the trailer.

In aspects, a value for each of the updated set of candidate points can be computed. In aspects, the value can be computed based on adding the estimated mean and the upper bound for each of the updated set of candidate points. In aspects, a ranked list can be generated based on the value computed for each of the updated set of candidate points. Once completed, this process can be repeated for a new set of sampled points used as the initial set of candidate points. In aspects, this process can be repeated until a termination condition is reached. The termination condition can result in an output indicating an optimal point for generating the trailer. The termination condition can be a predetermined set of iterations or can be a detection that no further improvement in the conversion values are obtained for the candidate points input into the MAB model.

In aspects, further customization can be done such that if an optimal point is obtained as a result of the processes described above, it can be further analyzed to determine whether it should or should not be used as the start of the trailer. For example, if the output of the processes described above results in a point in which the trailer results in nudity, explicit content, or a turning point in the multimedia content that if shown would result in the plot being spoiled, the point can be filtered so as to not use that optimal point. The filtering can be based on categorizations indicating the output is a scene that should not be shown. Thus, the next available optimal candidate point can be used instead.

BRIEF DESCRIPTION OF THE FIGURES

The accompanying drawings are incorporated herein and form a part of the specification.

FIG. 3 illustrates is a flowchart illustrating a process for automated preview (or trailer) generation for multimedia content, according to some aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
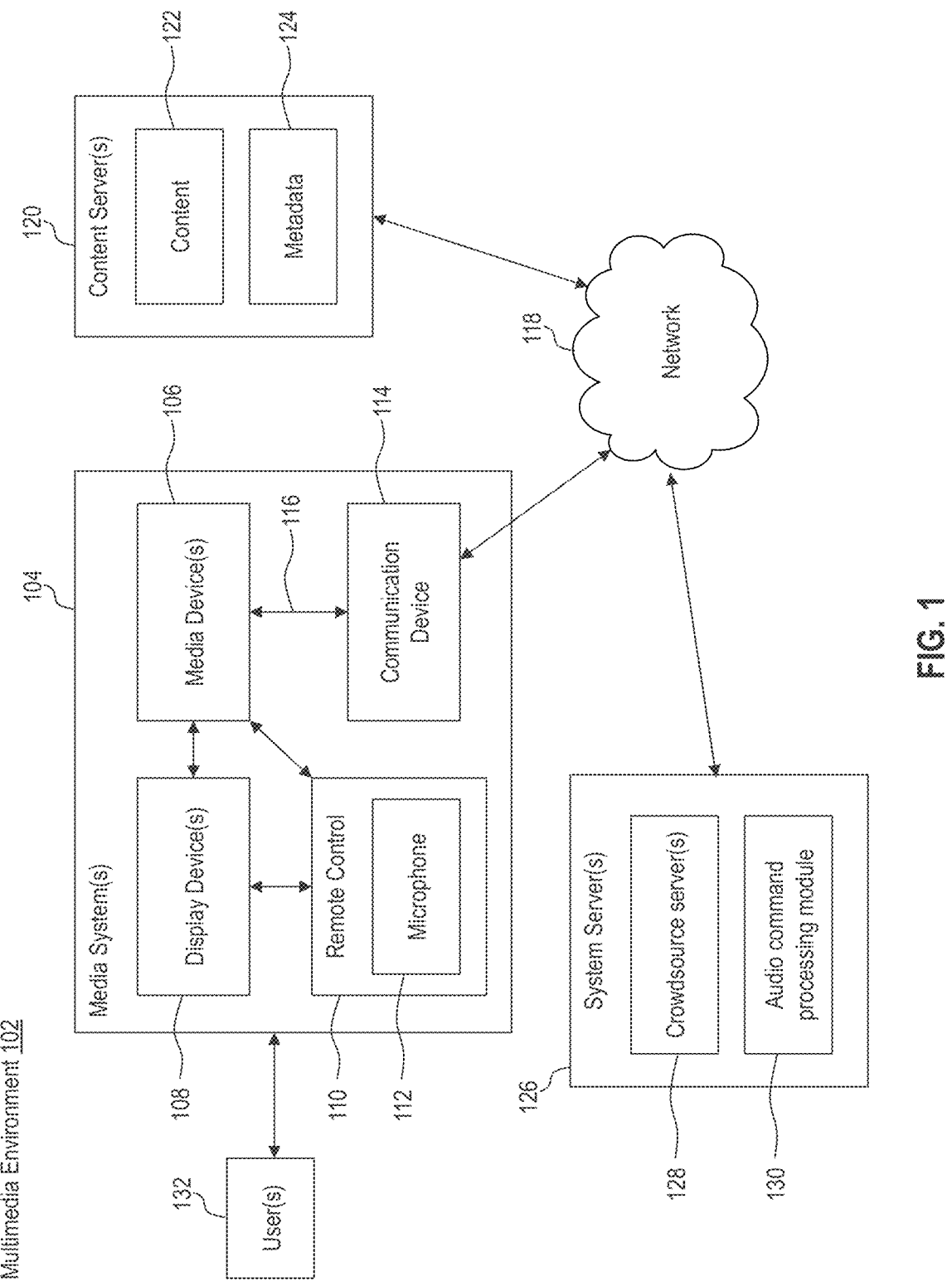
FIG. 1 illustrates a block diagram of a multimedia environment, according to some aspects.

Provided herein are system, apparatus, device, method and/or computer program product aspects, and/or combinations and sub-combinations thereof, for automated trailer (or preview) generation for multimedia content. Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.
Multimedia Environment FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various aspects, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an aspect, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
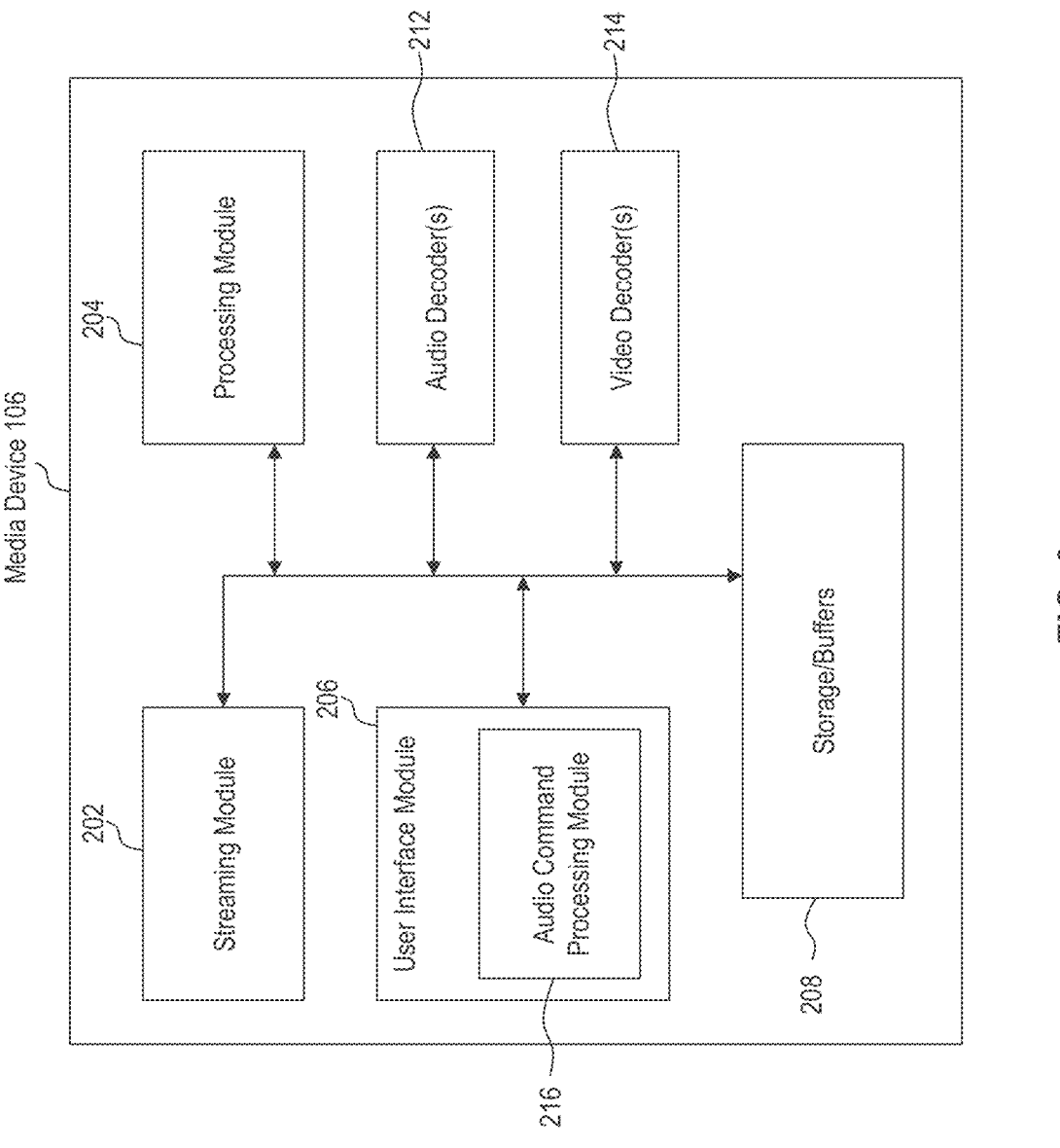
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Automated Trailer Generation

Referring to FIG. 1, the content servers 120, the system servers 126, or a combination thereof can be used for the automated trailer generation of the present disclosure. The trailer (or preview) generation can be for a piece of content 122. The disclosed system, method, and instructions stored on a non-transitory computer readable media for automated trailer generation is designed to solve the technological problems outlined in the Background section. Namely, (1) scaling trailer generation, (2) optimizing for the best clips to use as trailers to better engage users for multimedia content, and (3) allowing computers to produce relevant and user engaging trailers that previously could only be produced by human operators.

The improvements stem from the use of machine learning and/or AI models that provide a novel way of generating trailers for content 122 that does not rely on human intervention. The improvements also stem from using computer implemented models/rules that use acquired knowledge of what instances of time in the content 122 invoke user engagement. In aspects, that knowledge can be acquired using the crowdsource servers 128. That knowledge is then used to determine what other surrounding instances of time may lead to more optimal engagement by users. As a result, the system, method, and instructions provide an optimization that converges on an optimal point in the content 122, based on which a trailer can be generated that is most likely to lead to user engagement with the content 122. The use of these models are a very cost effective way of trailer generation (especially when scaled) due to the lack of need for human intervention.

Additionally, the disclosed system, method, and instructions, improves the state of the art from conventional systems because it allows for trailer generation to be scaled. Current methods of trailer generation require human intervention, editing, and subjective judgment. The disclosed system, method, and instructions, however, can be run on hundreds or thousands of pieces of content 122 to generate trailers, without the need of further human intervention to generate, edit, or produce the trailers. This results in an efficient use of computing and manpower.

An example aspect operates by generating an initial set of candidate points to generate a trailer for the content 122. Conversion data can be determined for each of the initial set of candidate points. An updated set of candidate points is then sampled either based on the conversion data or randomly chosen without considering the conversion data. In aspects, an estimated mean and upper bound is determined for each of the updated set of candidate points. A value is computed for each of the updated set of candidate points. A ranked list is generated based on the value computed for each of the updated set of candidate points. The process is repeated until an optimal candidate point is converged upon.

FIG. 3 illustrates is a flowchart illustrating a process 300 for automated preview (or trailer) generation for multimedia content, according to some aspects. Process 300 can be performed by processing logic that can comprise hardware (e.g., circuitry, dedicated logic, programmable logic, microcode, etc.), software (e.g., instructions executing on a processing device), or a combination thereof. The software can consist of modules installed on the content servers 120, the system servers 126, or a combination thereof. The modules can perform the functions described below with respect to process 300. It is to be appreciated that not all steps may be needed to perform the disclosure provided herein. Further, some of the steps may be performed simultaneously, or in a different order than shown in FIG. 3, as will be understood by a person of ordinary skill in the art As previously indicated, the purpose of process 300 can be to automate the preview (or trailer) generation process for multimedia content. The multimedia content can be the same as the content 122 described with respect to FIG. 1.

In aspects, process 300 can be performed using the content servers 120, the system servers 126, or a combination thereof. Thus, the content servers 120, the system servers 126, or a combination thereof can execute instructions (e.g., software) using components such as processors, memory devices, etc., to perform the processes necessary to generate the trailers for the multimedia content.

In aspects, process 300 can be implemented as instructions stored on a non-transitory computer readable medium of the content servers 120, the system servers 126, or a combination thereof. In aspects, the instructions can be processed by one or more processors to perform the functions described with respect to process 300. The non-transitory computer readable medium can be one or more memory devices.

In step 302, in order to generate a trailer for a piece of content 122, process 300 can begin by generating an initial set of candidate points for the content 122 to be used as starting points for a trailer. The initial set of candidate points can be from any time instance of the content 122. For the purposes of this disclosure, the initial set of candidate points will also be referred to as Q points. Each of the initial set of candidate points will be referred to as points {Q1, Q2, . . . , Qk}, where k is an integer value representing the maximum number of Q points.

In aspects, a variety of methods can be used to generate the initial set of candidate points. For example, the initial set of candidate points can be chosen at random. In other aspects, computer implemented models can be used to generate the initial set of candidate points. For example, content based models (such as deep video understanding models), interaction based models (such as those using clip interaction data), or commercially available models such as those provided by Vionlabs AB of Stockholm, Sweden can be used. A person of ordinary skill in the art will be familiar with such models and their details will not be discussed in detail. For the purposes of this disclosure, it is assumed that such models can be used to generate the initial set of candidate points.

The aforementioned models may seek to obtain mood, interaction, and/or features of scenes of the content 122, so that the initial set of candidate points are chosen based on the genre of the content 122 to better represent what the content 122 relates to. The assumption is that matching the clips to the genre of the content 122 will best engage users. This, however, does not necessarily have to be the case, and candidate points can be chosen that do not represent the genre of the content 122. As an example, a war movie can have candidate points selected from scenes depicting war. However, in aspects, a war movie can also have candidate points selected from scenes depicting peaceful dialog. How the candidate points are chosen can be customized.

In step 304, once the initial set of candidate points are generated, conversion data for each of the initial set of candidate points can be determined. Conversion data refers to how often users consume/engage with the content 122 when each of the initial set of candidate points is set as the starting point of a trailer. As an example, in aspects, for each of the initial set of candidate points, a 30 second clip can be generated as a trailer with that initial candidate point being the start of the 30 second clip. That clip can be shown to users of the multimedia environment 102, and engagement statistics can be collected. In aspects, the initial set of candidate points can be input into a computer implemented model to obtain the conversion data. In aspects, this model can be a Multi-Armed Bandit (MAB) model. MAB models are known to persons of skill in the art and will not be discussed in detail. For the purposes of discussion and with respect to this disclosure it is assumed that the MAB model will output the conversion data. For the purposes of this disclosure the conversion data for each of the initial set of candidate points will also be referenced as {Cov(Q1), Cov(Q2), . . . , Cov(Qk)} throughout this disclosure, where k is an integer value representing the maximum number of Q points sampled.

In step 306, once the conversion data is obtained, an updated set of candidate points can be sampled based on the conversion data. The sampling can include choosing from amongst the initial set of candidate points the ones with the highest rates of conversion (i.e., the ones indicating the highest user engagement) and sampling points around those points as the updated set of candidate points. What is determined to be a high rate of conversion can be set by a designer of the system. In alternative embodiments, the updated set of candidate points can be chosen at random without considering the conversion data. For the purposes of this disclosure the updated set of candidate points will be referenced as {D1, D2, . . . , Dm}, where m is an integer representing the maximum number of updated set of candidate points D.

The sampling of the updated set of candidate points can be done in a variety of ways. In aspects, the sampling can be done using a predetermined threshold. For example, the predetermined threshold can be a percentage value, which can serve as a cutoff point. Thus, the initial set of candidate points that have conversion rates above that predetermined threshold can be chosen as the updated set of candidate points. For example, the predetermined threshold can be a conversion rate of X percent, where X is a positive number. If the conversion rate for any initial set of candidate point is above X percent, it can be chosen to be part of the updated set of candidate points. In aspects, the sampling can further include choosing points surrounding the initial set of candidate points that have high conversion rates. Thus, random selections can be made of points if they fall within a certain time range relative to the initial set of candidate points with high conversion rates. This can be, for example, ±X seconds of an initial candidate point with a high conversion rate. The aforementioned is merely exemplary, and other techniques can be used as recognized by a person of ordinary skill in the art reading this disclosure.

The above sampling methods can provide advantages of two other approaches to sampling. These are the so called grid sampling approach and the other is a local search approach. The grid sampling approach involves continually randomly sampling the content 122 to find other candidate points different from the initial set of candidate points and determining what their conversion rates are and then choosing the ones with the highest conversion rates. This can be done continuously until all the potential starting points in the content 122 are exhausted. This approach, however, is undesirable because it is computationally expensive and takes a long time to randomly sample all the potential starting points of the content 122.

The local search approach involves using the initial set of candidate points and adding or subtracting some time from each point to see if a new point results in better engagement. This approach, however, is not desirable because it doesn't use the conversion data knowledge to select updated candidate points. Thus, it only iterates through points without leveraging existing knowledge about the best converting initial set of candidate points, and is therefore less desirable than the approach outline in this disclosure. Additionally, it can result in situations where a seemingly optimal point is found, but that point is not a true optimal point because of the constraints introduced by adding or subtracting time form each point, which may result in the system not searching a full range of points.

In steps 308, once the updated set of candidate points are obtained, an estimated mean for each of the updated set of candidate points can be determined.

In step 310, once the updated set of candidate points are obtained, an upper bound for each of the updated set of candidate points can also be determined.

The purpose of determining the estimated mean and the upper bound for each of the updated set of candidate points is two fold. First, it is to exploit knowledge of which updated set of candidate points best engage the users, and second is to use this knowledge to explore further candidate points around each of the updated set of candidate points that might better engage the users. Thus, the purpose of performing these computations is to optimize and converge on the best point to use as the start of the trailer. Since it is already known that certain points have higher user engagement rates as indicated by the conversion data, it is desirable to determine if any further points around those points will yield better results for user engagement.

In aspects, in order to determine an estimated mean for each of the updated set of candidate points, and assuming that the updated set of candidate points is among Qi and Qj, where i and j are integer values, and where the value of either i or j cannot be greater than k, which is the maximum number of the initial set of candidate points Q, equation (1), shown below, can be used.

$$E(\text{Cov}(Dt))=(\text{Cov}(Qi)*1/\text{Distance}(Dt,Qi)+\text{Cov}(Qj)*1/ \\ \text{Distance}(Dt,Qj))/(1/\text{Distance}(Dt,Qi)+1/\text{Distance} \\ (Dt,Qj)) \qquad (1)$$

In equation (1), E(Cov(Dt)) is the estimated mean value for an updated candidate point; Cov(Qi) is the conversion rate for an initial candidate point; Distance(Dt,Qi) is the distance (in time) between the start point of the updated candidate point and the initial candidate point; Cov(Qj) is the conversion rate for a further initial candidate point; Distance(Dt,Qj)) is the distance (in time) between the start points of the updated candidate point and the further initial candidate point; and i and j are integer values, where the value of either i or j cannot be greater than k, which is the maximum number of the initial set of candidate points Q.

In aspects, in order to determine the upper bound for each of the updated set of candidate points equation (2), shown below, can be used.

$$\text{UpperBound}(Dt)=\text{alpha}*\text{sqrt}((\text{Min\_distance}(Dt,Qi)/ \\ n))+\text{beta}*\text{sqrt}(\log(n)/N(Dt)) \qquad (2)$$

In equation (2), UpperBound(Dt) is the upper bound value of an updated candidate point; alpha is a constant; beta is another constant; Min_distance(Dt,Qi) is the minimum distance (in time) between the start points of the updated candidate point and an initial candidate point; n is a number of iterations to perform the computation for; and N(Dt) is the number of times a content 122 is shown starting from the updated candidate point Dt.

In step 312, a value for each of the updated set of candidate points can be computed. In aspects, the value can be computed based on adding the estimated mean and the upper bound for each of the updated set of candidate points obtained using equations (1) and (2).

In step 314, a ranked list can be generated based on the value computed for each of the updated set of candidate points. The ranked list represents an ordered list of the updated set of candidate points that can represent the best points based on the processes performed above.

In step 316, this process can be repeated for a new set of sampled points used as the initial set of candidate points. In aspects, this process can be repeated until a termination condition is reached. The termination condition can result in an output indicating an optimal point for generating the trailer. The termination condition can be a predetermined set of iterations or can be a detection that no further improvement in the conversion values are obtained for the candidate points input into the MAB model.

In aspects, further customization can be done such that if a candidate point is obtained as a result of the processes described above, it can be further analyzed to determine whether it is a point that results in a trailer that should not be shown. For example, if the optimized output results in a candidate point that if used as the starting point for a trailer, results in a scene that shows nudity, explicit content, or is a turning point in the content 122 and showing scene would result in the plot being spoiled, the candidate point can be filtered so as to not use that as a candidate point. Thus, the next optimal candidate point can be used instead. In aspects, the filtering can be done using categorizations for what is nudity, explicit content, etc. These can be based on machine learning models that can categorize scenes. These models can be, for example, the content based models (such as deep video understanding models) previously described.

The process 300 described in FIG. 3 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of any of the servers or devices of the system, or installed as a removable portion of the servers or devices of the system.

Architecture of Computer Systems Implementing Process 300

Figure 4:
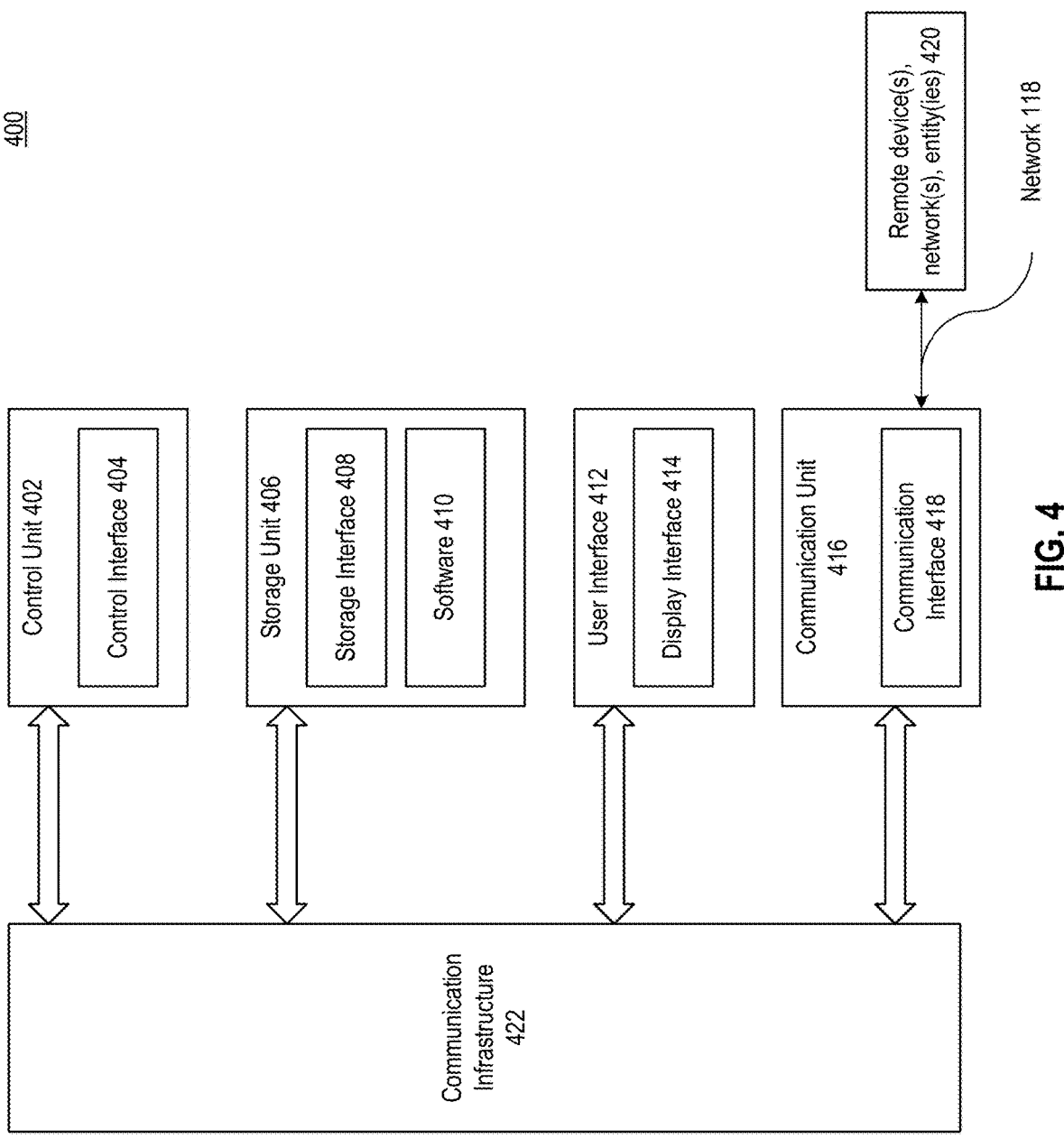
FIG. 4 illustrates an example computer system useful for implementing various aspects.

FIG. 4 illustrates an example computer system 400 useful for implementing various aspects. In aspects, the computer system 400 may be the components of the servers (e.g., content servers 120 or system servers 126) that are used to implement the functions of the process 300. In aspects, the computer system 400 may include a control unit 402, a storage unit 406, a communication unit 416, and a user interface 412. The control unit 402 may include a control interface 404. The control unit 402 may execute a software 410 to provide some or all of the intelligence of computer system 400. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), a graphics processing unit (GPU), or a combination thereof.

The control interface 404 may be used for communication between the control unit 402 and other functional units or devices of computer system 400. The control interface 404 may also be used for communication that is external to the functional units or devices of computer system 400. The control interface 404 may receive information from the functional units or devices of computer system 400, or from remote devices 420 such as databases used in conjunction with the computer system 400, or may transmit information to the functional units or devices of computer system 400, or to remote devices 420. The remote devices 420 refer to units or devices external to computer system 400.

The control interface 404 may be implemented in different ways and may include different implementations depending on which functional units or devices of computer system 400 or remote devices 420 are being interfaced with the control unit 402. For example, the control interface 404 may be implemented with optical circuitry, waveguides, wireless circuitry, wireline circuitry to attach to a bus, an application programming interface, or a combination thereof. The control interface 404 may be connected to a communication infrastructure 422, such as a bus, to interface with the functional units or devices of computer system 400 or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a non-volatile storage such as nonvolatile random access memory (NVRAM), Flash memory, disk storage, or a volatile storage such as static random access memory (SRAM) or dynamic random access memory (DRAM).

The storage unit 406 may include a storage interface 408. The storage interface 408 may be used for communication between the storage unit 406 and other functional units or devices of computer system 400. The storage interface 408 may also be used for communication that is external to computer system 400. The storage interface 408 may receive information from the other functional units or devices of computer system 400 or from remote devices 420, or may transmit information to the other functional units or devices of computer system 400 or to remote devices 420. The storage interface 408 may include different implementations depending on which functional units or devices of computer system 400 or remote devices 420 are being interfaced with the storage unit 406. The storage interface 408 may be implemented with technologies and techniques similar to the implementation of the control interface 404.

The communication unit 416 may enable communication to devices, components, modules, or units of computer system 400 or to remote devices 420. For example, the communication unit 416 may permit the computer system 400 to communicate between its components such as the content servers 120, the media system 104, and the system servers 126. The communication unit 416 may further permit the devices of computer system 400 to communicate with remote devices 420 such as an attachment, a peripheral device, or a combination thereof through network 118.

As previously indicated with respect to FIG. 1, the network 118 may span and represent a variety of networks and network topologies. For example, the network 118 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 118. Cable, Ethernet, digital subscriber line (DSL), fiber optic lines, fiber to the home (FTTH), and plain old telephone service (POTS) are examples of wired communication that may be included in the network 118. Further, the network 118 may traverse a number of network topologies and distances. For example, the network 118 may include direct connection, personal area network (PAN), local area network (LAN), metropolitan area network (MAN), wide area network (WAN), or a combination thereof.

The communication unit 416 may also function as a communication hub allowing computer system 400 to function as part of the network 118 and not be limited to be an end point or terminal unit to the network 118. The communication unit 416 may include active and passive components, such as microelectronics or an antenna, for interaction with the network 118.

The communication unit 416 may include a communication interface 418. The communication interface 418 may be used for communication between the communication unit 416 and other functional units or devices of computer system 400 or to remote devices 420. The communication interface 418 may receive information from the other functional units or devices of computer system 400, or from remote devices 420, or may transmit information to the other functional units or devices of the computer system 400 or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by computer system 400. The user interface 412 may interact with input devices and an output device. Examples of the input device of the user interface 412 may include a keypad, buttons, switches, touchpads, soft-keys, a keyboard, a mouse, or any combination thereof to provide data and communication inputs. Examples of the output device may include a display interface 414. The control unit 402 may operate the user interface 412 to present information generated by computer system 400. The control unit 402 may also execute the software 410 to present information generated by computer system 400, or to control other functional units of computer system 400. The display interface 414 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, passive devices, or a combination thereof. Further, if a module or unit is written in the system or apparatus claims section below, the module or unit is deemed to include hardware circuitry for the purposes and the scope of the system or apparatus claims.

The modules and units in the aforementioned description of the aspects may be coupled to one another as described or as shown. The coupling may be direct or indirect, without or with intervening items between coupled modules or units. The coupling may be by physical contact or by communication between modules or units.

CONCLUSION

The sections set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for automated trailer generation, the computer-implemented method comprising:
   (a) generating, by at least one computer processor, an initial set of candidate points to generate a trailer for a media content;
   (b) generating an updated set of candidate points for the initial set of candidate points based on a conversion data;
   (c) computing a value for each of the updated set of candidate points, wherein the value is computed based on adding an estimated mean and an upper bound determined for each of the updated set of candidate points;
   (d) generating a ranked list based on the value computed for each of the updated set of candidate points;
   (e) performing (b)-(d), using a new initial set of candidate points generated and input into a Multi-Armed Bandit (MAB) model until a termination condition is reached, wherein the termination condition results in an output indicating an optimal point for generating the trailer; and
   (f) filtering the output based on a categorization indicating the output is a scene that should not be shown, wherein the filtering is performed using a machine-learning model trained to categorize scenes.

2. The computer-implemented method of claim 1, wherein the filtering is performed based on the machine-learning model determining the scene involves nudity.

3. The computer-implemented method of claim 1, wherein the filtering is performed based on the machine-learning model determining the scene involves explicit content.

4. The computer-implemented method of claim 1, wherein the filtering is performed based on the machine-learning model determining the scene relates to a turning point in the media content.

5. The computer-implemented method of claim 1, further comprising determining the conversion data based on processing the initial set of candidate points using the MAB model to obtain the conversion data.

6. The computer-implemented method of claim 1, wherein the estimated mean for each of the updated set of candidate points is determined by:

$$E(Cov(Dt))=(Cov(Qi)*1/Distance(Dt,Qi)+Cov(Qj)*1/Distance(Dt,Qj))/(1/Distance(Dt,Qi)+1/Distance(Dt,Qj)),$$

wherein:

E(Cov(Dt)) is an estimated mean value for an updated candidate point;

Cov(Qi) is a conversion rate for an initial candidate point;

Distance(Dt,Qi) is a distance in time between a start of the updated candidate point and the initial candidate point;

Cov(Qj) is a conversion rate for a further initial candidate point;

Distance(Dt,Qj) is a distance in time between the start of the updated candidate point and the further initial candidate point; and i and j are integer values, where either i or j cannot be greater than a maximum number of the initial set of candidate points Q.

7. The computer-implemented method of claim 1, wherein the upper bound for each of the updated set of candidate points is determined by:

$$UpperBound(Dt)=alpha*sqrt((Min\_distance(Dt,Qi)/n))+beta*sqrt(log(n)/N(Dt)),$$

wherein:

UpperBound(Dt) is an upper bound value of an updated candidate point;

alpha is a constant;

beta is a constant;

Min_distance(Dt, Qi) is a minimum distance in time between a start of the updated candidate point and an initial candidate point;

n is a number of iterations to perform the determination for; and

N(Dt) is a number of times the media content is shown starting from the updated candidate point.

8. A non-transitory computer readable medium including instructions for automated trailer generation that when performed by a computing system, cause the computing system to perform operations comprising:

(a) generating an initial set of candidate points to generate a trailer for a media content;

(b) generating an updated set of candidate points for the initial set of candidate points based on a conversion data;

(c) computing a value for each of the updated set of candidate points, wherein the value is computed based on adding an estimated mean and an upper bound determined for each of the updated set of candidate points;

(d) generating a ranked list based on the value computed for each of the updated set of candidate points;

(e) performing (b)-(d), using a new initial set of candidate points generated and input into a Multi-Armed Bandit (MAB) model until a termination condition is reached, wherein the termination condition results in an output indicating an optimal point for generating the trailer; and (f) filtering the output based on a categorization indicating the output is a scene that should not be shown, wherein the filtering is performed using a machine-learning model trained to categorize scenes.

9. The non-transitory computer readable medium of claim 8, wherein the filtering is performed based on the machine-learning model determining the scene involves nudity.

10. The non-transitory computer readable medium of claim 8, wherein the filtering is performed based on the machine-learning model determining the scene involves explicit content.

11. The non-transitory computer readable medium of claim 8, wherein the filtering is performed based on the machine-learning model determining the scene relates to a turning point in the media content.

12. The non-transitory computer readable medium of claim 8, wherein the operations further comprise determining the conversion data based on processing the initial set of candidate points using the MAB model to obtain the conversion data.

13. The non-transitory computer readable medium of claim 8, wherein the estimated mean for each of the updated set of candidate points is determined by:

$$E(Cov(Dt))=(Cov(Qi)*1/Distance(Dt,Qi)+Cov(Qj)*1/Distance(Dt,Qj))/(1/Distance(Dt,Qi)+1/Distance(Dt,Qj)),$$

wherein:

E(Cov(Dt)) is an estimated mean value for an updated candidate point;

Cov(Qi) is a conversion rate for an initial candidate point;

Distance(Dt,Qi) is a distance in time between a start of the updated candidate point and the initial candidate point;

Cov(Qj) is a conversion rate for a further initial candidate point;

Distance(Dt,Qj) is a distance in time between the start of the updated candidate point and the further initial candidate point; and i and j are integer values, where either i or j cannot be greater than a maximum number of the initial set of candidate points Q.

14. The non-transitory computer readable medium of claim 8, wherein the upper bound for each of the updated set of candidate points is determined by:

$$UpperBound(Dt)=alpha*sqrt((Min\_distance(Dt,Qi)/n))+beta*sqrt(log(n)/N(Dt)),$$

wherein:

UpperBound(Dt) is an upper bound value of an updated candidate point;

alpha is a constant;

beta is a constant;

Min_distance(Dt, Qi) is a minimum distance in time between a start of the updated candidate point and an initial candidate point;

n is a number of iterations to perform the determination for; and

N(Dt) is a number of times the media content is shown starting from the updated candidate point.

15. A system for automated trailer generation, comprising:

one or more memories; and at least one processor each coupled to at least one of the memories and configured to perform operations comprising:

(a) generating an initial set of candidate points to generate a trailer for a media content;

(b) generating an updated set of candidate points for the initial set of candidate points based on a conversion data;

(c) computing a value for each of the updated set of candidate points, wherein the value is computed based on adding an estimated mean and an upper bound determined for each of the updated set of candidate points;

(d) generating a ranked list based on the value computed for each of the updated set of candidate points;

(e) performing (b)-(d), using a new initial set of candidate points generated and input into a Multi-Armed Bandit (MAB) model until a termination condition is reached, wherein the termination condition results in an output indicating an optimal point for generating the trailer; and (f) filtering the output based on a categorization indicating the output is a scene that should not be shown, wherein the filtering is performed using a machine learning model trained to categorize scenes.

16. The system of claim 15, wherein the filtering is performed based on the machine learning model determining the scene involves nudity.

17. The system of claim 15, wherein the filtering is performed based on the machine learning model determining the scene involves explicit content.

18. The system of claim 15, wherein the filtering is performed based on the machine learning model determining the scene relates to a turning point in the media content.

19. The system of claim 15, wherein the estimated mean for each of the updated set of candidate points is determined by:

$$E(\text{Cov}(Dt))=(\text{Cov}(Qi)*1/\text{Distance}(Dt,Qi)+\text{Cov}(Qj)*1/\text{Distance}(Dt,Qj))/(1/\text{Distance}(Dt,Qi)+1/\text{Distance}(Dt,Qj)),$$

wherein:

$E(\text{Cov}(Dt))$ is an estimated mean value for an updated candidate point;

$\text{Cov}(Qi)$ is a conversion rate for an initial candidate point;

$\text{Distance}(Dt,Qi)$ is a distance in time between a start of the updated candidate point and the initial candidate point;

$\text{Cov}(Qj)$ is a conversion rate for a further initial candidate point;

$\text{Distance}(Dt,Qj)$ is a distance in time between the start of the updated candidate point and the further initial candidate point; and i and j are integer values, where either i or j cannot be greater than a maximum number of the initial set of candidate points Q.

20. The system of claim 15, wherein the upper bound for each of the updated set of candidate points is determined by:

$$\text{UpperBound}(Dt)=\text{alpha}*\text{sqrt}((\text{Min\_distance}(Dt,Qi)/n))+\text{beta}*\text{sqrt}(\log(n)/N(Dt)),$$

wherein:

$\text{UpperBound}(Dt)$ is an upper bound value of an updated candidate point;

alpha is a constant;

beta is a constant;

$\text{Min\_distance}(Dt, Qi)$ is a minimum distance in time between a start of the updated candidate point and an initial candidate point;

n is a number of iterations to perform the determination for; and $N(Dt)$ is a number of times the media content is shown starting from the updated candidate point.

\* \* \* \* \*